United States Patent
Li et al.

(10) Patent No.: US 11,009,124 B2
(45) Date of Patent: May 18, 2021

(54) HYDRODYNAMIC TORQUE CONVERTERS WITH INTEGRATED ENGINE DISCONNECT DEVICES OF MOTOR VEHICLE POWERTRAINS

(71) Applicant: GM GLOBAL TECHNOLOGY OPERATIONS LLC, Detroit, MI (US)

(72) Inventors: Dongxu Li, Fray, MI (US); Chunhao J. Lee, Troy, MI (US); Farzad Samie, Franklin, MI (US); Derek F. Lahr, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 122 days.

(21) Appl. No.: 16/518,119

(22) Filed: Jul. 22, 2019

(65) Prior Publication Data

US 2021/0025490 A1 Jan. 28, 2021

(51) Int. Cl.
| | |
|---|---|
| *F16H 61/14* | (2006.01) |
| *F16H 31/00* | (2006.01) |
| *B60W 20/10* | (2016.01) |
| *F16H 45/02* | (2006.01) |
| *F16D 7/04* | (2006.01) |
| *F16D 7/10* | (2006.01) |
| *F16H 45/00* | (2006.01) |

(52) U.S. Cl.
CPC .............. *F16H 61/14* (2013.01); *B60W 20/10* (2013.01); *F16D 7/048* (2013.01); *F16D 7/10* (2013.01); *F16H 31/004* (2013.01); *F16H 45/02* (2013.01); *F16H 2045/002* (2013.01)

(58) Field of Classification Search
CPC ...... F16H 45/02; F16H 2045/002; F16D 7/04; F16D 7/048
See application file for complete search history.

(56) References Cited

U.S. PATENT DOCUMENTS

| | | | |
|---|---|---|---|
| 4,140,208 A * | 2/1979 | Clauss | ................. F16H 61/141 192/103 B |
| 4,860,861 A | 8/1989 | Gooch et al. | |
| 4,889,012 A | 12/1989 | Dull | |

(Continued)

FOREIGN PATENT DOCUMENTS

JP 6354203 B2 9/2015

*Primary Examiner* — Stacey A Fluhart
(74) *Attorney, Agent, or Firm* — Quinn IP Law

(57) ABSTRACT

Presented are torque converters with integrated engine disconnect devices, methods for making/using such torque converters, and electric-drive vehicles equipped with such torque converters. A torque converter (TC) assembly includes a TC housing that drivingly connects to an engine output member. A TC output member projects from the TC housing and drivingly connects to a transmission input member. A turbine with a bladed turbine shell is mounted on the TC output member and rotatable within the TC's internal fluid chamber. An impeller with a bladed impeller shell is juxtaposed with the turbine and rotatable within the fluid chamber. An engine disconnect device, which is disposed within the fluid chamber between the impeller shell and TC housing, drivingly couples the impeller to and, when desired, drivingly decouples the impeller from the TC housing and engine output member to thereby transfer torque and prevent torque transfer, respectively, between the engine and transmission.

20 Claims, 3 Drawing Sheets

(56) References Cited

U.S. PATENT DOCUMENTS

| | | | |
|---|---|---|---|
| 5,789,823 A * | 8/1998 | Sherman | B60K 6/383 |
| | | | 290/47 |
| 5,947,243 A | 9/1999 | MacDonald | |
| 7,198,587 B2 | 4/2007 | Samie et al. | |
| 7,681,675 B2 | 3/2010 | Samie et al. | |
| 7,824,292 B2 | 11/2010 | Samie et al. | |
| 7,862,437 B2 | 1/2011 | Clark et al. | |
| 7,878,935 B2 | 2/2011 | Lahr | |
| 7,931,561 B2 | 4/2011 | Otanez et al. | |
| 7,980,992 B2 | 7/2011 | Sturgin | |
| 8,011,464 B2 | 9/2011 | Samie et al. | |
| 8,029,403 B2 | 10/2011 | Lee et al. | |
| 8,042,669 B2 | 10/2011 | Samie et al. | |
| 8,042,670 B2 | 10/2011 | Bartos et al. | |
| 8,056,690 B2 | 11/2011 | Samie et al. | |
| 8,061,496 B2 | 11/2011 | Samie et al. | |
| 8,083,042 B2 | 12/2011 | Samie et al. | |
| 8,087,502 B2 | 1/2012 | Samie et al. | |
| 8,177,677 B2 | 5/2012 | Samie et al. | |
| 8,196,724 B2 | 6/2012 | Samie et al. | |
| 8,202,198 B2 | 6/2012 | Samie et al. | |
| 8,287,411 B2 | 10/2012 | Lee et al. | |
| 8,296,020 B2 | 10/2012 | Lee et al. | |
| 8,298,105 B2 * | 10/2012 | Kajigai | B60W 10/023 |
| | | | 475/35 |
| 8,348,796 B2 | 1/2013 | Samie et al. | |
| 8,357,069 B2 | 1/2013 | Diemer et al. | |
| 8,371,982 B2 | 2/2013 | Lee et al. | |
| 8,371,984 B2 | 2/2013 | Diemer et al. | |
| 8,409,053 B2 | 4/2013 | Samie et al. | |
| 8,425,364 B2 | 4/2013 | Lahr | |
| 8,454,466 B2 | 6/2013 | Samie et al. | |
| 8,469,847 B2 | 6/2013 | Lee et al. | |
| 8,478,498 B2 | 7/2013 | Lee et al. | |
| 8,494,738 B2 | 7/2013 | Lee et al. | |
| 8,499,912 B2 | 8/2013 | Samie et al. | |
| 8,540,065 B2 | 9/2013 | Samie et al. | |
| 8,606,709 B2 | 12/2013 | Gupta | |
| 8,622,186 B2 | 1/2014 | Samie et al. | |
| 8,655,525 B2 | 2/2014 | Samie et al. | |
| 10,288,159 B2 | 5/2019 | Li et al. | |
| 10,293,674 B1 | 5/2019 | Wilton | |
| 10,337,597 B2 | 7/2019 | Samie et al. | |
| 2005/0126878 A1 | 6/2005 | Samie | |
| 2009/0157272 A1 * | 6/2009 | Uhler | F16H 45/02 |
| | | | 701/67 |
| 2010/0273603 A1 | 10/2010 | Roses et al. | |
| 2011/0114433 A1 * | 5/2011 | Hattori | F16H 45/02 |
| | | | 192/3.29 |
| 2012/0090952 A1 | 4/2012 | Lee et al. | |
| 2013/0291528 A1 * | 11/2013 | Strong | F16F 15/1236 |
| | | | 60/341 |
| 2014/0251744 A1 | 9/2014 | Steinberger et al. | |
| 2015/0021137 A1 * | 1/2015 | Lindemann | F16H 41/24 |
| | | | 192/3.29 |
| 2017/0328455 A1 | 11/2017 | Li et al. | |
| 2017/0328456 A1 | 11/2017 | Samie et al. | |
| 2018/0163793 A1 | 6/2018 | Jeong et al. | |
| 2018/0355962 A1 | 12/2018 | Lahr et al. | |
| 2019/0168731 A1 | 6/2019 | Lee et al. | |

* cited by examiner

HYDRODYNAMIC TORQUE CONVERTERS WITH INTEGRATED ENGINE DISCONNECT DEVICES OF MOTOR VEHICLE POWERTRAINS

INTRODUCTION

The present disclosure relates generally to motor vehicle powertrains. More specifically, aspects of this disclosure relate to engine disconnect devices with attendant control logic and hydraulic hardware for hybrid electric powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and efficiency. Such engines include compression-ignited (CI) diesel engines, spark-ignited (SI) gasoline engines, two, four, and six-stroke architectures, and rotary engines, as non-limiting examples. Hybrid electric and full electric vehicles, on the other hand, utilize alternative power sources to propel the vehicle, such as an electric motor generator unit (MGU), and therefore minimize or eliminate reliance on a fossil-fuel based engine for tractive power.

A full electric vehicle (FEV)—colloquially referred to as an "electric car"—is a type of electric-drive vehicle configuration that altogether removes the internal combustion engine and attendant peripheral components from the powertrain system, relying solely on electric traction motors for propulsion and for supporting accessory loads. The engine, fuel supply system, and exhaust system of an ICE-based vehicle are replaced with a single or multiple traction motors, a traction battery back, and battery cooling and charging electronics in an FEV. Hybrid vehicle powertrains, in contrast, employ multiple sources of tractive power to propel the vehicle, most commonly operating an internal combustion engine assembly in conjunction with a battery-powered or fuel-cell-powered electric motor. Since hybrid vehicles are able to derive their power from sources other than the engine, hybrid electric vehicle (HEV) engines may be turned off, in whole or in part, while the vehicle is propelled by the electric motor(s).

There are three basic hybrid vehicle powertrain architectures: parallel hybrid, series hybrid, and series-parallel ("power-split") hybrid configurations. Series hybrid architectures, for example, derive all tractive power from electric motors and therefore eliminate any driving mechanical connection between the engine and final drive members. In this case, the engine functions solely as a regenerative energy source, driving an electric generator that charges the vehicle's onboard traction battery pack. In parallel hybrid architectures, the engine and motor/generator assemblies each has a driving mechanical coupling to the power transmission and, thus, the vehicle's road wheels. As the name implies, series-parallel hybrid architectures combine features from both parallel hybrid and series hybrid powertrains. With engine-only, motor-only and motor-boost operating modes, the engine and motor work independently or jointly—in parallel or in series—depending on the desired vehicle speed, overall vehicle power demand, and state-of-charge (SOC) of the battery.

Vehicle powertrains employing an automatic transmission commonly insert a hydrodynamic torque converter between the internal combustion engine and the multi-speed transmission to govern the transfer of rotational power therebetween. Torque converters are designed to selectively transmit power from the engine to the drivetrain system for vehicle propulsion, and to allow the crankshaft to spin without the engine stalling when the vehicle wheels and transmission gears come to a stop. Replacing the mechanical clutch of a manual transmission, a standard torque converter (TC) acts as a fluid coupling with an impeller that is connected to the engine's output shaft, a turbine that is connected to the transmission's input shaft, and a stator interposed between the impeller and turbine to regulate fluid flow between their respective fluid volumes. A hydraulic pump modulates fluid pressure within the torque converter housing to regulate the transfer of rotational energy from the impeller to the turbine. A large difference in speed between the impeller and turbine results in torque multiplication of the impeller torque, as for example when the vehicle is accelerating from rest with the engine running.

Some torque converters are equipped with an internal clutch mechanism that is engaged to rigidly connect the engine's crankshaft to the transmission's input shaft when their speeds are nearly equal, e.g., to avoid unwanted slippage and resultant efficiency losses. System "slip" occurs because the rotational speed of the impeller relative to the rotational speed of the turbine in the torque converter are inherently different. A large slip percentage between the engine output and transmission input affects the fuel economy of the vehicle; employing a torque converter clutch (TCC) helps to significantly reduce the slip. The TCC operates to mechanically lock the impeller at the output of the engine to the turbine at the input of the transmission so that the engine output and transmission input rotate at the same speed. Application of the TCC may be controlled by a powertrain control module (PCM) to modify clutch engaging forces under certain operating conditions, for example, during clutch-to-clutch shifts to eliminate undesired torque fluctuations and engine speed changes during transient periods when torque flow interruption is desired.

One of the many available types of parallel hybrid powertrains is the parallel two-clutch (P2) architecture, which may be typified by a single engine, an automatic power transmission, and a single motor/generator unit that is "side attached" to the transmission in parallel power-flow communication to the engine. Mechanically interposed between the engine and motor/generator unit is a disconnect clutch that, unlike the TCC discussed above, drivingly disengages the engine from both the MGU and transmission such that the MGU can be operated independent of the engine to propel the vehicle. P2 architectures help to reduce system costs over counterpart hybrid powertrains by eliminating the use of additional MGUs and reducing the complexity of the transmission. The P2 architecture also helps to eliminate engine friction during regenerative braking operations, and allows the motor/generator to spin at higher speeds while recovering more energy.

SUMMARY

Presented herein are torque converter assemblies with integrated engine disconnect devices, hybrid vehicle powertrains equipped with such TC assemblies, methods for making and methods for operating such TC assemblies, and electric-drive vehicles equipped with hydrodynamic torque converters with integrated engine disconnect clutches. By way of example, a modular TC assembly design incorporates an engine disconnect device that is packaged inside the TC's fluid volume, inserted between the fluid impeller and a transmission-side rear (pump) cover. In a more specific example, the engine disconnect device may be embodied as a friction clutch that is hydraulically actuable to friction-lock the impeller shell and blades to the rear pump cover. Along the same lines, the TCC may be embodied as a discrete friction clutch that is separately hydraulically actuable to friction-lock the turbine shell and blades to the impeller shell and blades. An optional one-way clutch (OWC) may be mechanically interposed between the impeller shell and pump cover to carry positive torque, e.g., during engine-only driving modes.

Attendant benefits for at least some of the disclosed integrated engine disconnect device configurations include simplified and broadened engine disconnect capabilities for both FWD and RWD applications, e.g., to avoid losses from engine motoring during engine "Stop & Start" (S/S) and during regenerative braking. Disclosed features also help to improve engine disconnect response time for hybrid vehicles, e.g., for transitioning into coasting and motor-only operating modes. With proposed hybrid powertrain architectures and control methodologies, increased fuel economy and reduced emissions are realized with minimal additional cost and reduced system complexity. Disclosed module TC assembly designs also help to minimize packaging space requirements by reducing the axial length of the engine disconnect device.

Aspects of this disclosure are directed to hydrodynamic torque converter assemblies with integrated engine disconnect devices and torque converter lockup clutches for managing the transfer of torque between power transmissions and internal combustion engines. A torque converter assembly is presented for operatively connecting an engine with a transmission of a motor vehicle. This TC assembly includes a torque converter housing, which may be embodied as a front (turbine) cover welded to a rear (pump) cover to define therebetween an internal fluid chamber. The TC housing's front cover drivingly connects, e.g., via lugs, to an engine output member, which may be in the nature of a crankshaft, engine hub, and flex plate. A TC output member, which may be embodied as a turbine shaft, projects from the TC housing and drivingly connects to an input member of the transmission, which may be in the nature of a transmission input shaft or gear.

The TC assembly also includes a turbine with multiple turbine blades mounted to a turbine shell. The bladed turbine shell is mounted for common rotation on the TC output member, rotatable within the internal fluid chamber of the TC housing. An impeller with multiple impeller blades mounted to an impeller shell is juxtaposed with the turbine shell. The bladed impeller shell is rotatable within the TC housing's fluid chamber, e.g., mounted on stator shaft for common rotation therewith. An engine disconnect device is packaged inside the TC housing, located within the internal fluid chamber and interposed between the impeller shell and the TC housing's pump cover. The engine disconnect device is operable to drivingly couple the impeller to the TC housing and, thus, the engine output member to enable torque transfer between the engine and transmission. The engine disconnect device also drivingly decouples the impeller from the TC housing and engine output member to thereby prevent torque transfer between the engine and transmission.

Additional aspects of this disclosure are directed to electric-drive vehicles and hybrid electric powertrains equipped with TC assemblies having integrated engine disconnect devices. As used herein, the terms "vehicle" and "motor vehicle" may be used interchangeably and synonymously to include any relevant vehicle platform, such as passenger vehicles (ICE, HEV, BEV, PHEV, etc.), commercial vehicles, industrial vehicles, tracked vehicles, off-road and all-terrain vehicles (ATV), motorcycles, farm equipment, watercraft, aircraft, etc. Disclosed features may be most effective for, but are certainly not limited to, P2, P2.5, P3 and P4 hybrid electric powertrain architectures. In an example, a motor vehicle includes a vehicle body with multiple road wheels and other standard original equipment. An internal combustion engine is mounted onto the vehicle body and outputs engine-generated torque via a crankshaft. The internal combustion engine may operate alone or in conjunction with a traction motor to drive one or more of the road wheels to thereby propel the vehicle. A multi-speed power transmission receives torque that is output by the ICE and/or motor, then modifies and transmits received torque to a final drive system of the motor vehicle.

Continuing with the discussion of the above example, the motor vehicle also includes a hydrodynamic torque converter assembly that operatively connects the ICE assembly to the power transmission to govern the transfer of torque therebetween. The TC assembly includes a TC housing that is drivingly connected to the engine's crankshaft. A TC output shaft, which projects from the TC housing, is drivingly connected to the transmission's input shaft. A turbine with a bladed turbine shell is mounted on the TC output shaft, rotatable within the TC housing's internal fluid chamber. In this regard, an impeller with a bladed impeller shell is juxtaposed with the turbine shell, rotatable within the TC housing's fluid chamber. An engine disconnect device is disposed within the internal fluid chamber, located between the impeller shell and TC housing. The engine disconnect device selectively drivingly couples the impeller to and, when desired, decouples the impeller from the TC housing and engine crankshaft to thereby enable torque transfer and, when desired, disable torque transfer between the engine to the transmission.

Additional aspects of this disclosure are directed to methods for making and methods for operating any of the disclosed engine disconnect devices, hybrid powertrains, and motor vehicles. In an example, a method is presented for assembling a torque converter assembly for operatively connecting an engine with a transmission. This representative method includes, in any order and in any combination with any of the above and below options and features: providing a TC housing defining an internal fluid chamber and configured to drivingly connect to the engine's output member; inserting a TC output member into the internal fluid chamber to project from the TC housing, the TC output member being configured to drivingly connect to the transmission's input member; mounting a turbine on the TC output member such that the turbine is rotatable within the fluid chamber, the turbine including turbine blades mounted to a turbine shell; positioning an impeller adjacent the turbine such that the impeller is rotatable within the fluid chamber, the impeller including impeller blades mounted to an impeller shell; and positioning an engine disconnect device within the internal fluid chamber between the impeller shell and TC housing, the engine disconnect device being operable to: drivingly couple the impeller to the TC housing and engine output member to enable torque transfer between the engine and transmission; and drivingly decouple the impeller from the TC housing and engine output member to thereby disable torque transfer between the engine and transmission.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
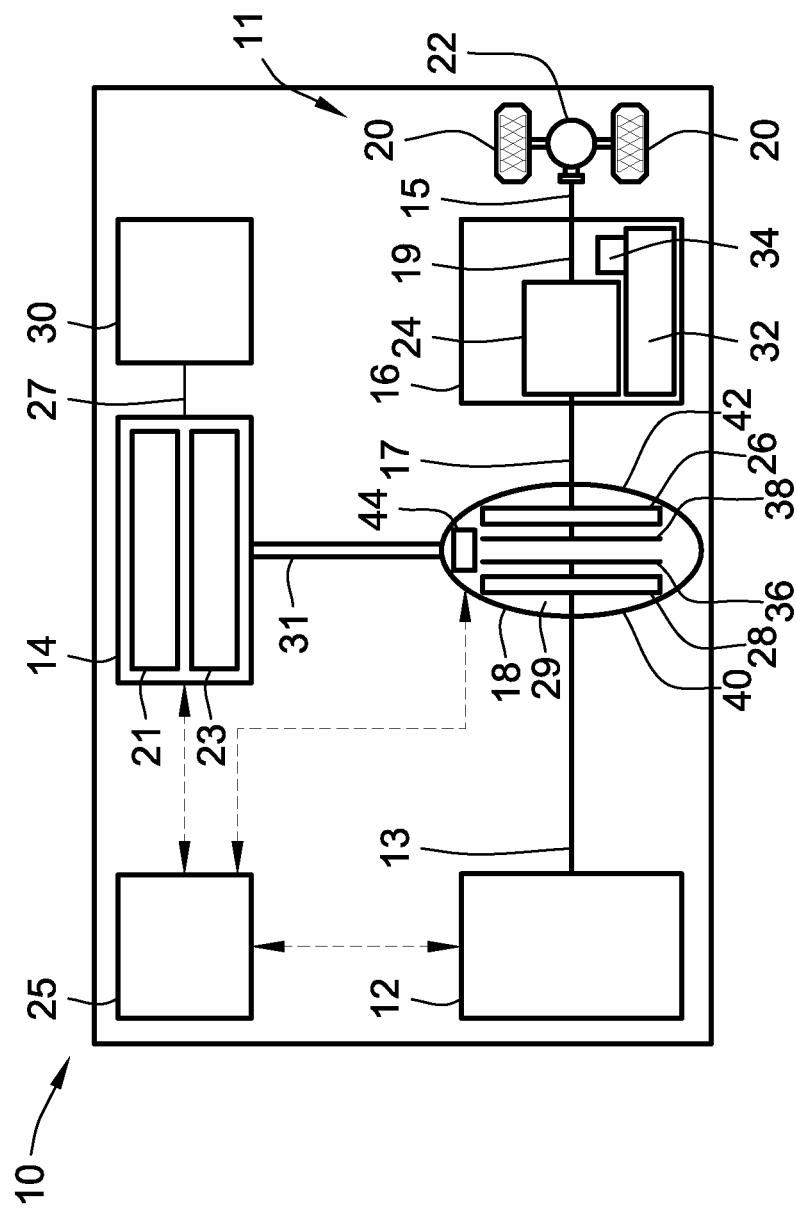
FIG. 1 is a schematic illustration of a representative electric-drive motor vehicle with a hybrid powertrain having an engine assembly drivingly connected to a multi-speed power transmission and an electric traction motor by a torque converter assembly with an integrated engine disconnect device in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a P2 hybrid-electric powertrain. In particular, the illustrated powertrain is generally composed of a single engine 12 and a single motor 14 that operate, individually and in concert, to transmit tractive power to a multi-speed power transmission 16 through a hydrokinetic torque converter (TC) assembly 18 to drive one or more road wheels 20 of the vehicle's final drive system 11. The illustrated automobile 10—also referred to herein as "motor vehicle" or "vehicle" for short—is merely an exemplary application with which novel aspects and features of this disclosure can be practiced. In the same vein, implementation of the present concepts into a P2 hybrid powertrain architecture should also be appreciated as an exemplary application of the novel concepts disclosed herein. As such, it will be understood that aspects and features of the present disclosure can be applied to other vehicle powertrain configurations and utilized for any logically relevant type of motor vehicle. Lastly, only select components have been shown and will be described in additional detail herein. Nevertheless, the vehicles, powertrains, and disconnect devices discussed below can include numerous additional and alternative features, and other available peripheral components, e.g., for carrying out the various methods and functions of this disclosure.

The representative vehicle powertrain system is shown in FIG. 1 with a prime mover, such as a restartable internal combustion engine (ICE) assembly 12, that is drivingly connected to a driveshaft 15 of a final drive system 11 by a multi-speed automatic power transmission 16. The engine 12 transfers power, preferably by way of torque via an engine crankshaft 13 ("engine output member"), to an input side of the transmission 16. According to the illustrated example, the ICE assembly 12 rotates an engine-driven torsional damper assembly 26, an engine disconnect device 28, and a lockup-type torque converter clutch 44, all of which have been incorporated into the hydrokinetic TC assembly 18. When operatively engaged, this engine disconnect device 28 transmits torque received from the ICE assembly 12 through the TC assembly 18. The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and TC assembly 18 of FIG. 1 may share a common transmission oil pan or "sump" 32 for supply of hydraulic fluid, as well as a shared transmission pump 34 for sufficient hydraulic pressure to activate the elements of the transmission 16 and TC assembly 18, including the integrated engine disconnect device 28 and TCC 44.

The ICE assembly 12 operates to propel the vehicle 10 independently of the electric traction motor 14, e.g., in an "engine-only" operating mode, or in cooperation with the motor 14, e.g., in a "motor-boost" operating mode. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, etc.

FIG. 1 also depicts an electric motor/generator unit 14 or other suitable traction motor that operatively connects via a motor support hub, shaft, or belt 31 ("motor output member") to torque converter assembly 18, and via TC assembly 18 to an input shaft 17 ("transmission input member") of the transmission 16. The motor/generator unit 14 may be directly coupled onto a TC input shaft or rigidly mounted to a housing portion of the torque converter 18. The electric motor/generator unit 14 is composed of an annular stator 21 circumscribing and concentric with a rotor 23. Electric power is provided to the stator 21 through electrical conductors or cables 27 that pass through the motor housing in suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller, such as programmable electronic control unit (ECU) 25. While shown as a P2 hybrid-electric architecture with a single motor in parallel power-flow communication with a single engine assembly, the vehicle 10 may employ other powertrain configurations, including PS, P1, P3, and P4 hybrid powertrains, any of which may be adapted for a hybrid electric vehicle (HEV), plug-in hybrid electric vehicle (PHEV), fuel-cell hybrid electric vehicle (FCEV), etc.

Power transmission 16 may use differential gearing 24 to achieve selectively variable torque and speed ratios between the transmission's input and output shafts 17 and 19, respectively, e.g., while sending all or a fraction of its power through the variable elements. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts. While envisioned as an 8-speed automatic transmission, the power transmission 16 may optionally take on other suitable configurations, including Continuously Variable Transmission (CVT) architectures, automated-manual transmissions, etc.

As indicated above, ECU 25 is constructed and programmed to govern, among other things, operation of the engine 12, motor 14, transmission 16, TC assembly 18, engine disconnect device 28, and lockup clutch 44. Control module, module, controller, control unit, electronic control unit, processor, and any permutations thereof, may be used interchangeably and synonymously to mean any one or various combinations of one or more of logic circuits, combinational logic circuit(s), Application Specific Integrated Circuit(s) (ASIC), electronic circuit(s), central processing unit(s) (e.g., microprocessor(s)), input/output circuit (s) and devices, appropriate signal conditioning and buffer circuitry, and other components to provide the described functionality, etc. Associated memory and storage (e.g., read only, programmable read only, random access, hard drive, tangible, etc.)), whether resident, remote or a combination of both, store processor-executable software and/or firmware programs or routines.

Software, firmware, programs, instructions, routines, code, algorithms, and similar terms may be used interchangeably and synonymously to mean any processor-executable instruction sets, including calibrations and look-up tables. The ECU 25 may be designed with a set of control routines executed to provide desired functions. Control routines are executed, such as by a central processing unit, and are operable to monitor inputs from sensing devices and other networked control modules, and execute control and diagnostic routines to govern operation of devices and actuators. Such inputs may include vehicle speed and acceleration data, speed limit data, traffic light status and location data, road gradient data, stop sign location data, traffic flow data, geospatial data, road and lane-level data, vehicle dynamics data, sensor data, etc. Routines may be executed in real-time, continuously, systematically, sporadically and/or at regular intervals, for example, each 100 microseconds, 3.125, 6.25, 12.5, 25 and 100 milliseconds, etc., during vehicle use. Alternatively, routines may be executed in response to occurrence of an event during operation of the vehicle 10.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber 29 of the TC assembly 18 is a bladed impeller 36 juxtaposed with a bladed turbine 38. The impeller 36 is packaged in facing spaced relation with the turbine 38, with a stator (FIG. 2) located between the impeller 36 and turbine 38 to selectively alter fluid flow therebetween. The transfer of engine torque from the crankshaft 13 to the transmission 16 via the TC assembly 18 is through stirring excitation of hydraulic fluid, such as transmission oil, inside the TC's internal fluid chamber 29 caused by rotation of the turbine and impeller blades. TC assembly 18 is constructed with a protective outer housing composed of a transmission-side (rear) pump cover 40 sealingly attached to an engine-side (front) turbine cover 42.

Figure 2:
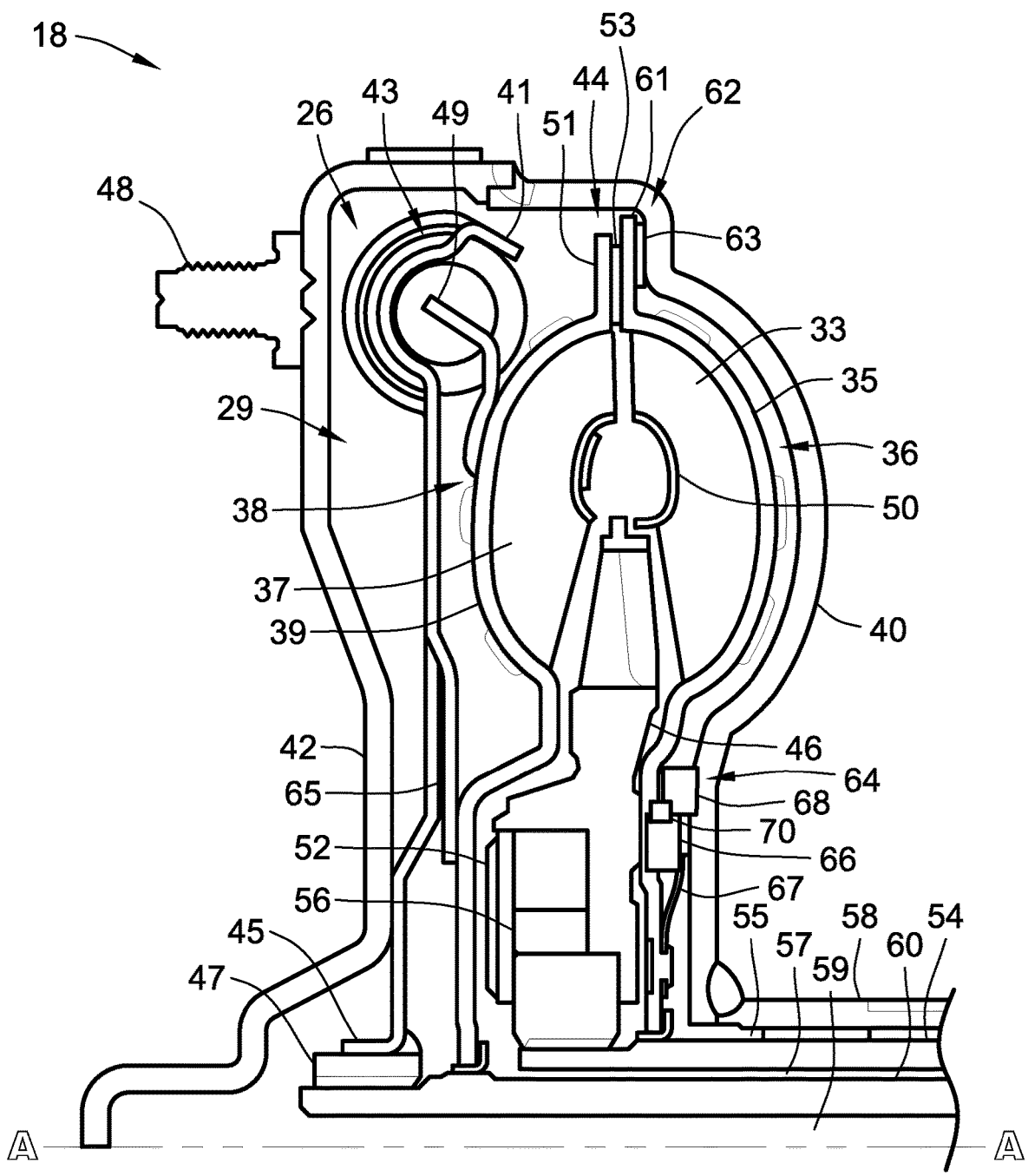
FIG. 2 is a sectional, side-view illustration of a representative hydrodynamic torque converter assembly with an integrated engine disconnect clutch, torsional damper, and torque converter lockup clutch in accordance with aspects of the present disclosure.

FIG. 2 is a side-view illustration of an upper half of the representative torque converter assembly 18 of FIG. 1, taken in cross-section along a vertical plane that passes through the assembly's central axis of rotation A-A (cross-hatching omitted for ease of reference). It should be appreciated that a cross-sectional, side-view illustration of the lower half of the TC assembly 18 is a near-identical mirrored image to that shown in FIG. 2. The torque converter 18 is assembled with an engine-driven impeller 36, an impeller-driven turbine 38, a fluid-flow altering stator 46, a torsional damper assembly 26, an engine disconnect device 28, and a lockup clutch 44. To protect these components, the TC assembly 18 is constructed with an annular housing that is defined principally by a rear pump cover 40 that is fixedly attached, e.g., via electron beam welding, MIG or MAG welding, laser welding, and the like, to a front turbine cover 42 such that a working hydraulic fluid chamber 29 is formed therebetween. An engine flexplate (not shown) is connected to the TC housing's front cover 42, e.g., via a series of circumferentially spaced lugs 48. The front cover 42 drivingly connects by way of the engine flexplate and a crankshaft hub (also not shown) to the engine's crankshaft 13 such that rotational power is transferable back-and-forth between the engine 12 and TC assembly 18.

The impeller 36—also referred to in the art as "pump"—is situated in serial power-flow fluid communication with the turbine 38. Interposed between the impeller 36 and turbine 38 is a stator 46 that selectively alters fluid flow returning from the turbine 38 to the impeller 36 such that returning fluid aids, rather than impedes, rotation of the impeller 36. The transfer of engine torque from the crankshaft 13 to the turbine 38, via the TC housing 40, 42 and impeller 36, is through the manipulation of hydraulic fluid inside the fluid chamber 29. More specifically, rotation of impeller blades 33, which are mounted on a compliant impeller shell 35 located between the pump cover 40 and an inner shroud 50, causes the hydraulic fluid to flow forward and toroidally outward toward the turbine 38. When this occurs with sufficient force to overcome inertial resistance to rotation, turbine blades 37, which are coaxially oriented with the impeller blades 33 and mounted on a compliant turbine shell 39 located between the front cover 42 and inner shroud 50, begin to rotate with the impeller 36. The fluid flow exiting the turbine 38 is directed back into the impeller 36 by way of the stator 46. The stator 46—located between the flow exit section of the turbine 38 and the flow entrance section of the impeller 36—redirects the fluid flow from the turbine 38 to the impeller 36 in the same direction as impeller rotation, thereby reducing pump torque and causing torque multiplication.

Also disposed within the protective outer housing 40, 42 of the torque converter assembly 18 is a pair of thrust bearings 52 that rotatably support the stator 46. The stator 46 is connected to a hollow stator shaft 54 by way of a roller clutch 56 that is operable to prevent rotation of the stator 46 under calibrated operating conditions. At higher torque converter speeds, for example, the direction of hydraulic fluid leaving the turbine 38 changes, causing the stator 46 to over-run the roller clutch 56 and rotate freely on the stator shaft 54. The stator shaft 54 and a hollow TC output shaft 60 are encased within an outer pump hub 58, which is secured to the transmission's bell housing via a pump cover 40. Impeller shell 35 is slidably attached, e.g., via splined engagement, for common rotation on the stator shaft 54, whereas the turbine shell 39 is slidably attached, e.g., via splined engagement, for common rotation on the TC output shaft 60 (also referred to herein as "turbine shaft"). As shown, the pump hub 58 circumscribes the stator shaft 54 to cooperatively define therebetween a first hydraulic fluid path 55. Along the same lines, the stator shaft 54 circumscribes the turbine shaft 60 to cooperatively define therebetween a second hydraulic fluid path 57. A longitudinally elongated central cavity of the turbine shaft 60 defines a third hydraulic fluid path 59. All three fluid paths 55, 57, 59 are fluidly connected to a supply of hydraulic fluid, such as transmission oil sump 32, and independently modulated to govern operation of the TC assembly 18.

Fundamentally, as the internal combustion engine 12 operates at different rotational speeds it may produce torsional vibrations (colloquially known as "torsionals"). By way of example, when fuel is being fed to the engine 12 and it is generating power, e.g., through engagement of a fuel throttle (not shown) during normal operation of the vehicle 10, the engine 12 may produce torsionals that are undesirable to transmit to and through the transmission 16. In addition, when the engine 12 is not being fueled and, thus, is not powered (e.g., in a startup and/or a shutdown operation), the engine pistons may generate compression pulses. Both the torsionals and compression pulses can produce resultant vibrations and noise that may be sensed by a vehicle occupant. To cancel out the torsionals and compression pulses that may be produced by the engine 12, the torque converter assembly 18 is equipped with a torsional damper assembly 26 located between the turbine shell 39 and front turbine cover 42. This torsional damper assembly 26 may generally function to isolate the transmission 16 from unwanted torsionals generated during operation of the engine 12 and also to selectively aide the MGU 14 in canceling engine compression pulses during engine startup and shutdown operations.

With continuing reference to FIG. 2, the torsional damper assembly 26 includes a disc-shaped damper plate 41 bearing a circular array of spring-mass damper systems, referred to hereinafter as "SDS" and identified generally as 43. While it is envisioned that any logically relevant type of spring element may be employed, the SDS 43 of FIG. 2 each includes a helical compression spring terminating at opposing ends thereof with spring retainers. These SDS 43 are spaced circumferentially around and positioned proximate to the outer periphery of the damper plate 41. Integrally formed with the damper plate 41 is an annular damper plate hub 45 that is located radially inward from the SDS 43. The damper plate hub 45 locks the torsional damper assembly 26 to the TC output shaft 60, for example, by a splined interface 47. A circular pattern of axially projecting damper tangs 49 is attached to and extend forward from the turbine shell 39. Each damper tang 49 extends axially into a respective seat portion of the damper plate 41 and functions to mechanically engage with and thereby actuate a respective one of the SDS 43 during operation of the TC assembly 18, primarily during engagement of the lockup clutch 44.

Located inside the working hydraulic fluid chamber 29 between the impeller 36 and turbine 38 is a TCC 44 that operates to provide a direct driving connection between the engine 12 and transmission 16 by mechanically locking the impeller 36, which couples at the engine crankshaft 13, to the turbine 38, which couples at the transmission input shaft 17. In accord with the illustrated example, the TCC 44 includes a TCC clutch flange 51 that is integrally formed with or otherwise attached to an outer perimeter of the turbine shell 39. As shown, the TCC clutch flange 51 is a continuous annular rim that projects radially outward from the turbine shell 39. Disposed on a transmission-facing surface of the clutch flange 51 is a friction material 53 that is designed to friction-lock to a mating reaction surface on an engine-facing side of an EDC clutch flange 61 that projects from the impeller shell 35.

Activation and deactivation of the TCC clutch flange 51 and associated friction material 53 is achieved via fore-aft bending and/or sliding movement of the turbine shell 39 on the turbine shaft 60 in response to modulated hydraulic fluid flow into the fluid chamber 29. In particular, the TCC 44 is activated through increased hydraulic pressure on engine-facing sides of the turbine shell 39 and clutch flange 51, which is provisioned via inlet fluid flow along fluid path 59 through the central cavity of the turbine shaft 60. On the other hand, TCC 44 deactivation is achieved through increased hydraulic pressure on transmission-facing sides of the turbine shell 39 and clutch flange 51, which is provisioned via inlet fluid flow along fluid path 57. When the lockup clutch 44 is fully engaged (i.e., activated with no slip between the friction material 53 and the EDC clutch flange 61) the turbine 38 is frictionally joined to the impeller 36 such that the two components rotate in unison, allowing the engine 12 to effectively circumvent the TC assembly 18 and transmit power directly to the transmission 16 and final drive system 11. An optional biasing member, such as leaf spring 65 projecting from damper plate 41, pushes the turbine shell 39 and, thus, the TCC 44 towards the torque-carrying activated position (e.g., to the right in FIG. 2).

Integrated into the modular TC assembly 18 of FIGS. 1 and 2 is an engine disconnect device 28 for drivingly connecting and, when desired, disconnecting the ICE assembly 12 to/from both the traction motor 14 and automatic transmission 16. According to the illustrated example of FIG. 2, the engine disconnect device 28 is composed of a friction-type engine disconnect clutch (EDC) 62 and a freewheel-type one-way clutch (OWC) 64, both of which are packaged within the internal fluid chamber 29 of the TC housing 40, 42. Both the EDC 62 and OWC 64 are positioned between the impeller shell 35 and the pump cover 40, each providing a discrete mechanical interface between the impeller 36 and TC housing 40, 42. Cooperative operation of the EDC 62 and OWC 64 functions to provide a driving coupling between the impeller 36 and both the TC housing 40, 42 and engine's crankshaft 13 to enable torque transfer from the engine 12 to the transmission 16. Under predetermined driving conditions, the EDC 62 and OWC 64 are regulated to drivingly decouple the impeller 36 from the TC housing 40, 42 and crankshaft 13 to disable torque transfer from the transmission 16 to the engine 12.

Continuing with the discussion of the engine disconnect device 28 of FIG. 2, the OWC 64 is a unidirectional overrunning clutch that functions to automatically operatively connect (or "lock") the rear pump cover 40 and, thus, the engine 12 to the impeller shell 35 when the engine 12 generates positive torque and its rotational speed is no less than that of the impeller 36. In the illustrated example, the positive OWC 64 includes an annular inner race 66 that is concentrically aligned within an annular outer race 68. The outer race 68 is bolted, riveted, welded, and/or integrally formed with (collectively "rigidly attached") an interior surface of the pump cover 40 to rotate in unison therewith. By comparison, the inner race 66 is rigidly attached to an exterior surface of the impeller shell 35 to rotate in unison therewith. It is envisioned that other OWC designs may be implemented, including those with axially spaced, face-to-face plates, rather than concentric inner and outer races.

Disposed between and selectively rotatably coupling the inner and outer races 66, 68 of the OWC 64 is a series of circumferentially spaced torque transmitting elements 70. These torque transmitting elements 70 may comprise identically shaped and sized spring-biased cylindrical rollers; alternative configurations may incorporate any number, type, and combination of torque transmitting elements, including tapered rollers, needle rollers, sprags, pawls, struts, etc. When disengaged, the torque transmitting elements 70 are in an "unwedged" state to allow overrunning rotational motion or opposite rotational motion of the outer race 68 relative to the inner race 66 in a first (positive) direction or a second (negative) direction, respectively. When engaged, the torque transmitting elements 70 are in a "wedged" state to allow unitary rotational motion of the outer race 68 relative to the inner race 66 in the first (positive) direction. Optional biasing elements (not shown) may press or otherwise "preload" the torque transmitting elements 70 to the wedged position.

Locking of the impeller 36 to the TC housing 40, 42 for bidirectional transmission of torque therebetween is enabled by the selective hydraulic actuation of the friction-type EDC 62. Without the EDC 62, the OWC 64 and, thus, the engine disconnect device 28 embodied in FIGS. 1 and 2 transfers torque in a single "positive" direction. As such, when the EDC 62 is disengaged, the engine disconnect device 28 does not transfer in an opposite "negative" direction from the transmission 16 to engine 12. In accord with the illustrated example, the EDC 62 includes an EDC clutch flange 61 that is integrally formed with or otherwise attached to an outer perimeter of the impeller shell 35. As shown, the EDC clutch flange 61 is a continuous annular rim that projects at an oblique angle in a radially outward direction from the impeller shell 35. Disposed on a transmission-facing surface of the EDC flange 61 is a friction material 63 that is designed to friction-lock to a mating reaction surface on an engine-facing side of pump cover 40.

Activation and deactivation of the EDC clutch flange 61 and associated friction material 63 is achieved via fore-aft bending and/or sliding movement of the impeller shell 35 on the stator shaft 54 in response to modulated hydraulic fluid flow into the fluid chamber 29. In particular, the EDC 62 is activated through increased hydraulic pressure on engine-facing sides of the impeller shell 35 and EDC flange 61, which is provisioned via inlet fluid flow through the second hydraulic fluid path 57. On the other hand, EDC 62 deactivation is achieved through increased hydraulic pressure on transmission-facing sides of the impeller shell 35 and EDC flange 61, which is provisioned via inlet fluid flow along the first hydraulic fluid path 55. When the engine disconnect clutch 62 is fully engaged (i.e., activated with no slip between the friction material 63 and the pump cover 40) the impeller 36 is frictionally joined to the TC housing 40, 42 such that the two components rotate in unison, allowing the engine 12 to transmit power through the TC assembly 18 to the transmission 16 and final drive system 11. An optional biasing member, such as leaf spring 67 riveted to pump shell 35, pushes the pump shell 39 and, thus, the EDC 62 away from the torque-carrying activated position (e.g., to the left in FIG. 2). Independent modulation of fluid feeds through the discrete fluid paths 55, 57, 59 allows for individualized control of the TCC 44 and EDC 62.

Figure 3:
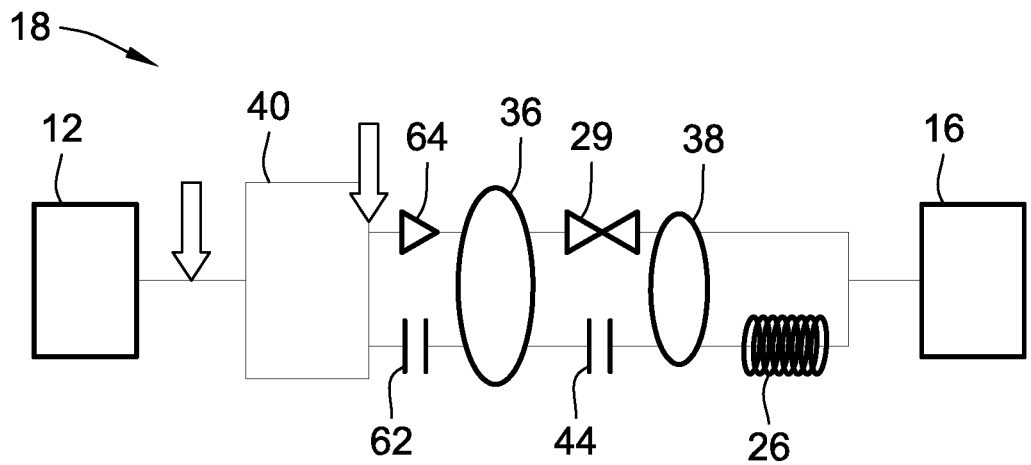
FIGS. 3-5 are schematic illustrations of different representative torque converter assemblies with integrated engine disconnect devices in accordance with aspects of the present disclosure.
Figure 4:
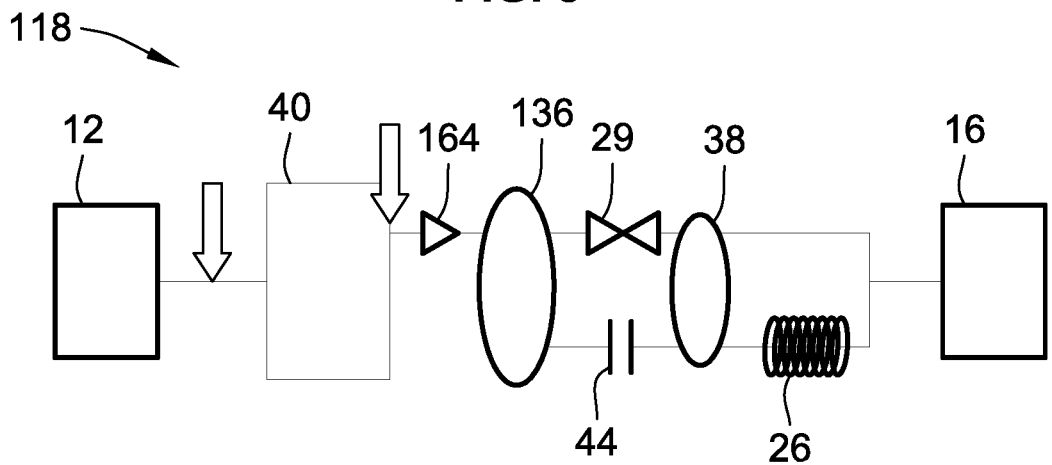
Figure 5:
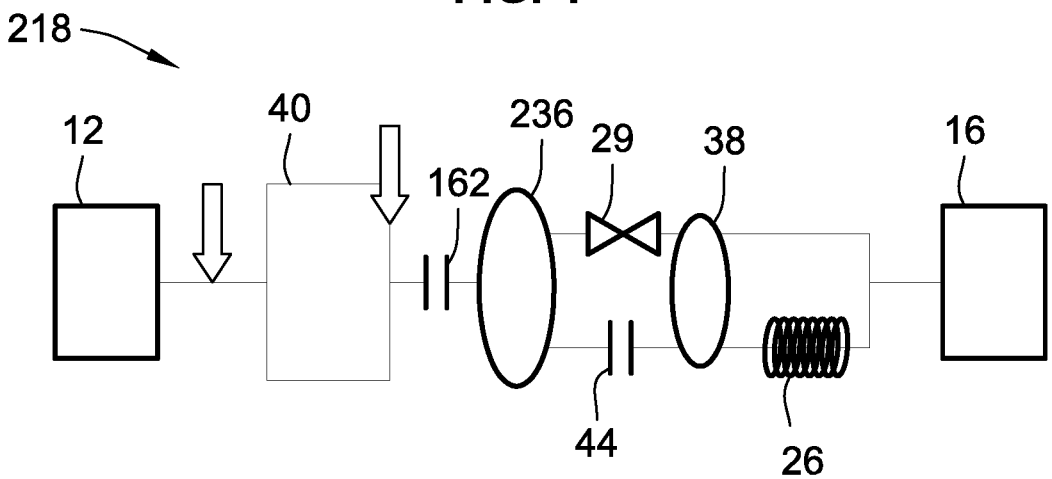

FIGS. 3-5 provide schematic illustrations of different representative torque converter assemblies with integrated engine disconnect devices, lockup clutches and torsional damper assemblies. FIG. 3 is representative of the embodiment presented in FIGS. 1 and 2, showing the TC assembly 18 with the EDC 62 and OWC 64 interposed between the pump cover 40 and impeller 36, while the TCC 44 is interposed between the impeller 36 and turbine 38. With this arrangement, the EDC 62 is in parallel powerflow communication with OWC 64, and both the EDC 62 and OWC 64 are in series powerflow communication with the torsional damper assembly 26 and TCC 44. Implementing the OWC 64 helps to simplify the control of the EDC 62 and thereby make EDC engagement and disengagement more robust. Conceptually, a friction-type clutch EDC 62 may provide similar functionality; however, high-controlled precision in clutch slip regulation under varying engine and MGU torque for smooth dis/engagement. FIG. 4 presents an alternative powertrain architecture in which a TC assembly 118 eliminates the EDC 62 and replaces the OWC 64 with a single selectable one-way clutch (SOWC) 164 interposed between the pump cover 40 and an impeller 36 in which the shell is fabricated without friction material 63. The SOWC 164 is selectively actuable to transition from a bidirectional torque-carrying state to a non-torque carrying state. Contrastingly, FIG. 5 presents an alternative powertrain architecture in which a TC assembly 118 eliminates the OWC 64 and utilizes a high-precision control EDC 162.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A torque converter assembly for operatively connecting an engine with a transmission of a motor vehicle, the engine having an engine output member, and the transmission having a transmission input member, the torque converter assembly comprising:
    a torque converter (TC) housing defining an internal fluid chamber and configured to drivingly connect to the engine output member;
    a TC output member attached to the TC housing and configured to drivingly connect to the transmission input member;
    a turbine with turbine blades mounted to a turbine shell, the turbine shell being attached to the TC output member and rotatable within the internal fluid chamber;
    an impeller with impeller blades mounted to an impeller shell, the impeller shell being juxtaposed with the turbine shell and rotatable within the internal fluid chamber; and
    an engine disconnect device disposed within the internal fluid chamber between the impeller shell and the TC housing, the engine disconnect device including a selectable one-way clutch (SOWC) with coaxial races and multiple torque transmitting elements coupling the coaxial races, the SOWC being selectively actuable to transition between a torque-carrying state and a non-torque carrying state, the engine disconnect device being configured to:
        drivingly couple the impeller to the TC housing and the engine output member to thereby transfer torque from the engine to the transmission; and
        drivingly decouple the impeller from the TC housing and the engine output member to thereby disable torque transfer between the engine and the transmission.

2. The torque converter assembly of claim 1, wherein the coaxial races include an annular inner race concentric with an annular outer race, and the torque transmitting elements include cylindrical rollers circumferentially spaced around the annular inner race.

3. The torque converter assembly of claim 1, wherein the engine disconnect device further includes a friction-type engine disconnect clutch (EDC) in parallel powerflow communication with the SOWC and selectively actuable to lock the impeller shell to the TC housing.

4. The torque converter assembly of claim 3, wherein the EDC includes an EDC flange projecting radially outward from the impeller shell, and an EDC friction surface protruding axially from the EDC flange and configured to fiction-lock to the TC housing.

5. The torque converter assembly of claim 1, wherein the coaxial races include an inner race rigidly secured to one of the impeller shell and the TC housing for common rotation therewith, and an outer race concentric with and circumscribing the inner race and rigidly secured to another one of the impeller shell and the TC housing for common rotation therewith.

6. The torque converter assembly of claim 1, wherein the plurality of torque transmitting elements includes multiple rollers, sprags, pawls, and/or struts disposed between and circumferentially spaced about the races.

7. The torque converter assembly of claim 1, wherein the engine disconnect device includes an engine disconnect clutch (EDC) selectively actuable to lock the impeller shell to the TC housing.

8. The torque converter assembly of claim 7, wherein the EDC includes an EDC flange projecting from the impeller shell, the EDC flange including an EDC friction surface configured to friction-lock to the TC housing.

9. The torque converter assembly of claim 8, wherein the EDC flange projects radially outward from the impeller shell, and wherein the EDC friction surface frictionally engages an interior surface of a pump cover of the TC housing.

10. The torque converter assembly of claim 1, wherein the TC housing includes a turbine cover rigidly attached to a pump cover to define therebetween the internal fluid chamber, the turbine cover being configured to rigidly couple to the engine output member for common rotation therewith, and the pump cover being configured to rotatably couple via a pump hub to a transmission housing of the transmission.

11. The torque converter assembly of claim 1, further comprising a torque converter clutch (TCC) disposed within the internal fluid chamber between the turbine and the impeller, the TCC being selectively actuable to lock the turbine shell to the impeller shell.

12. The torque converter assembly of claim 11, wherein the TCC includes a TCC flange projecting from the turbine shell, the TCC flange including a TCC friction surface configured to friction-lock to the impeller shell.

13. The torque converter assembly of claim 12, wherein the TCC flange projects radially outward from the turbine shell, and wherein the TCC friction surface frictionally engages an engine disconnect clutch (EDC) flange projecting radially outward from the impeller shell.

14. The torque converter assembly of claim 1, further comprising a torsional damper assembly disposed within the internal fluid chamber between the turbine shell and the TC housing, the torsional damper assembly being configured to dampen vibrations transmitted from the engine.

15. A motor vehicle comprising:
    a vehicle body with a plurality of road wheels attached to the vehicle body;
    an internal combustion engine mounted to the vehicle body and including an engine output shaft;
    a multi-speed power transmission mounted to the vehicle body and including transmission input and output shafts, the transmission output shaft being drivingly connected to one or more of the road wheels to thereby propel the motor vehicle; and
    a torque converter assembly operatively connecting the internal combustion engine with the power transmission, the torque converter assembly comprising:

a torque converter (TC) housing drivingly connected to the engine output shaft and defining therein an internal fluid chamber;

a TC output member attached to the TC housing and drivingly connected to the transmission input shaft;

a turbine with turbine blades mounted to a turbine shell, the turbine shell being attached to the TC output member and rotatable within the internal fluid chamber;

an impeller with impeller blades mounted to an impeller shell, the impeller shell being juxtaposed with the turbine shell and rotatable within the internal fluid chamber; and an engine disconnect device disposed within the internal fluid chamber between the impeller shell and the TC housing, the engine disconnect device including a selectable one-way clutch (SOWC) with coaxial races and multiple torque transmitting elements coupling the coaxial races, the SOWC being selectively actuable to transition between a torque-carrying state and a non-torque carrying state, the engine disconnect device being configured to:
  drivingly couple the impeller to the TC housing and the engine output shaft to thereby transfer torque from the engine to the transmission; and
  drivingly decouple the impeller from the TC housing and the engine output shaft to thereby disable torque transfer between the engine and the transmission.

16. A method of assembling a torque converter assembly for operatively connecting an engine with a transmission, the engine having an engine output member, and the transmission having a transmission input member, the method comprising:

providing a torque converter (TC) housing defining an internal fluid chamber and configured to drivingly connect to the engine output member;

inserting a TC output member into the internal fluid chamber of the TC housing, the TC output member being configured to drivingly connect to the transmission input member;

mounting a turbine in the TC housing such that the turbine is rotatable within the fluid chamber, the turbine including turbine blades mounted to a turbine shell;

positioning an impeller adjacent the turbine such that the impeller is rotatable within the fluid chamber, the impeller including impeller blades mounted to an impeller shell; and positioning an engine disconnect device within the internal fluid chamber between the impeller shell and the TC housing, the engine disconnect device including a selectable one-way clutch (SOWC) with coaxial races and multiple torque transmitting elements coupling the coaxial races, the SOWC being selectively actuable to transition between a torque-carrying state and a non-torque carrying state, the engine disconnect device being configured to:
  drivingly couple the impeller to the TC housing and the engine output member to thereby enable torque transfer between the engine and the transmission; and
  drivingly decouple the impeller from the TC housing and the engine output member to thereby disable torque transfer between the engine and the transmission.

17. The method of claim 16, wherein the coaxial races include concentric inner and outer races, and the torque transmitting elements include cylindrical rollers circumferentially spaced around the inner race.

18. The method of claim 17, wherein the EDC includes an EDC flange attached to the impeller shell, and an EDC friction surface protruding from the EDC flange and configured to fiction-lock to the TC housing.

19. The method of claim 18, wherein the EDC flange projects radially outward from the impeller shell, and wherein the EDC friction surface frictionally engages an interior surface of a pump cover of the TC housing.

20. The method of claim 16, wherein the engine disconnect device further includes an engine disconnect clutch (EDC) selectively actuable to lock the impeller shell to the TC housing.

* * * * *